United States Patent [19]

Herbert et al.

[11] 4,103,939
[45] Aug. 1, 1978

[54] MULTI PASSAGE FLEXIBLE CONNECTOR

[75] Inventors: John T. Herbert; Frank J. Kovitch, both of Arlington; Paul E. Sullivan, Euless, all of Tex.

[73] Assignee: Murdock Machine & Engineering Company, Irving, Tex.

[21] Appl. No.: 696,396

[22] Filed: Jun. 15, 1976

[51] Int. Cl.² .............................................. F16L 39/04
[52] U.S. Cl. ................................ 285/137 A; 285/234
[58] Field of Search .......... 285/49, 51, 137 R, 137 A, 285/234, 263, 261, 223, 131, 135, 136, 55

[56] References Cited

U.S. PATENT DOCUMENTS

| 908,414 | 12/1908 | Mellin | 285/136 |
|---|---|---|---|
| 3,190,374 | 6/1965 | Coperan et al. | 285/55 X |
| 3,194,589 | 7/1965 | Kahlbau et al. | 285/49 |
| 3,680,895 | 8/1972 | Herbert et al. | 285/261 X |
| 3,734,546 | 5/1973 | Herbert et al. | 285/49 |
| 3,853,337 | 12/1974 | Herbert | 285/54 X |
| 3,957,291 | 5/1976 | Edling et al. | 285/261 X |

FOREIGN PATENT DOCUMENTS

| 564,453 | 2/1958 | Belgium | 285/136 |
|---|---|---|---|
| 27,491 of | 1910 | United Kingdom | 285/136 |

Primary Examiner—Dave W. Arola
Attorney, Agent, or Firm—Richards, Harris & Medlock

[57] ABSTRACT

A multi-channel flexible connector for connecting multiple parallel conduits for relative angular deflection between input and output conduits. In a more specific aspect, offshore well pipes are connected to a surface unit as they extend upward from the ocean floor to accommodate motion of the surface unit. An annular cup-shaped housing with a central cavity and bottom ports therein is adapted to be joined to input pipes. A nipple having a downfacing and flared lower end is adapted to be joined to output pipes and is positioned in the housing cavity. An elastomeric body includes an assembly of concentric spherical rings radially spaced apart by elastomeric pads. The elastomeric body is adhered to the inner and outer surfaces of the flared end of the nipple, to the lower surface of a collar mounted in sealed relation with the inner surface of the housing and to the upper surface of a seat mounted in the bottom of the housing cavity thereby to define a main flow channel through the connector.

Flow channels extend through the flared end of the nipple displaced from the axis of the housing and through the elastomeric member and seat. Angular deviation between the axis of the nipple and that of the housing is accommodated by making the inner and outer surfaces of the flared end of the nipple, the surface of the seat and the rings of the elastomeric seal spherical with respect to a point located on the longitudinal axis of the annular housing below the flared end of the nipple.

11 Claims, 6 Drawing Figures

FIG. 6

MULTI PASSAGE FLEXIBLE CONNECTOR

FIELD OF THE INVENTION

This invention relates to a multi-passage connector which provides flexibility between rigid input and output flow channels.

PRIOR ART

In drilling and producing oil wells in marine areas too deep for the erection of a platform and requiring the use of floating surface structures, a surface casing generally is set in a relatively shallow borehole with the mouth of the casing therein at the ocean floor. Drilling operations are then conducted from a floating surface vessel through the casing. In this environment a connection is necessary between the casing and the riser which will permit lateral deflection of the riser in response to ocean currents and surface forces without undue stress, and which will provide for passage of drills, casing, tubes, tools, etc., from the surface into the borehole. In such environment, a connector is subject to widely varying forces. A drill string must pass downward through the riser and the connector, and thence into and through the surface casing during drilling operations. Drilling fluid pumped down through the drill pipe circulates back to the surface through the annulus as the well is drilled. Casing is then lowered through and set in the well by way of the riser and the connector. Producing operations may involve subjecting the riser connector to production pressures which could be substantially higher than the hydrostatic head on the outer periphery of the riser connector. When the well is placed in production, downhole installations frequently require actuators operable from the surface by way of hydraulic control lines.

In production operations, multiple plural flow lines are connected to a surface float structure which responds to wave motion. Connection of rigid pipes to a moving though anchored unit places undesirable stress on the pipes and joints therein.

Heretofore flexible pipe connections have been provided using elastomeric elements to accommodate deflection of rigid pipes at a joint. Representative of such structures are the joints illustrated and described in U.S. Pat. Nos. 3,390,899; 3,680,895; 3,734,546 and 3,853,722. In copending application Ser. No. 683,635, filed May 5, 1976, and now abandoned and assigned to the assignee of the present invention, a flexible ocean floor riser is described and claimed.

The present invention is directed to structure uniquely capable of providing flexibility in a plurality of joints between rigid input pipes and rigid output pipes. In such devices, the pipe sizes may vary in the range of from a few inches in diameter to several feet.

SUMMARY OF THE INVENTION

A connector for a plurality of rigid pipes is provided. An annular housing has a central cavity with bottom ports therein. A nipple extends into the housing with a flared end. Elastomeric bodies having assemblies of concentric spherical rings embedded therein are adhered to the inner and outer surface of the flared end. A collar encircles the nipple and is adhered to the outer surface of one elastomeric body. A seat in the housing is adhered to the second elastomeric body. At least one passage extends through the connector by way of a port in the flare of the nipple axially displaced from the axis of the housing.

By providing one or more through flow channels parallel to but displaced from the axis but integrated within the connector, flexible hose connections around the movable joint are eliminated.

DESCRIPTION OF THE DRAWINGS

Figure 1:
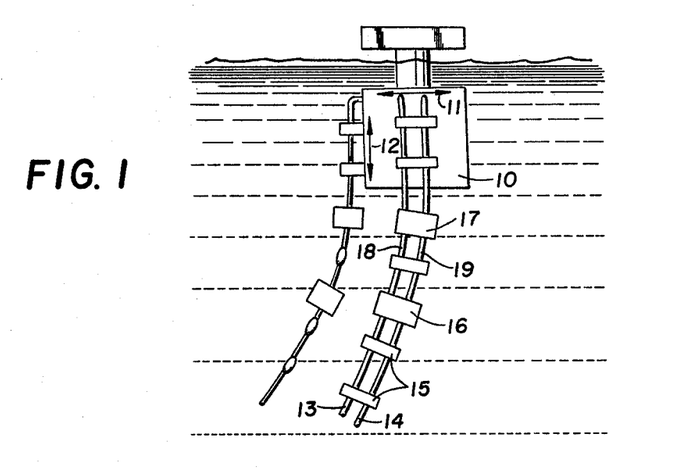
FIG. 1 illustrates connection of clusters of rigid pipes to a floating oil production unit.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

FIG. 1

Referring now to FIG. 1, a float unit 10 utilized in marine petroleum production operations may be generally anchored by means not shown. Though anchored to be restrained within limits, it is still somewhat responsive to wave motion and ocean currents as to be moved generally in the horizontal direction as indicated by arrow 11 and subject to vertical motion as indicated by arrow 12.

A plurality of rigid pipes 13 and 14 extend to or from subsurface terminals and accommodate flow of petroleum either to or from a float unit 10. In order to relieve the rigid pipes 13 and 14 from undue bending stress, one or more multi-passage flexible connectors are employed. As illustrated in FIG. 1, the pipes 13 and 14 are mechanically coupled by spacers 15. Flexible connectors 16 and 17 are located at spaced apart points to provide flexibility in the lines. Thus, there can be relative movement or deflection between the axes of pipes 13 and 14 and the axes of pipes 18 and 19. FIG. 1 illustrates a first environment in which a multi-passage flexible connector embodying the present invention is employed.

Figure 2:
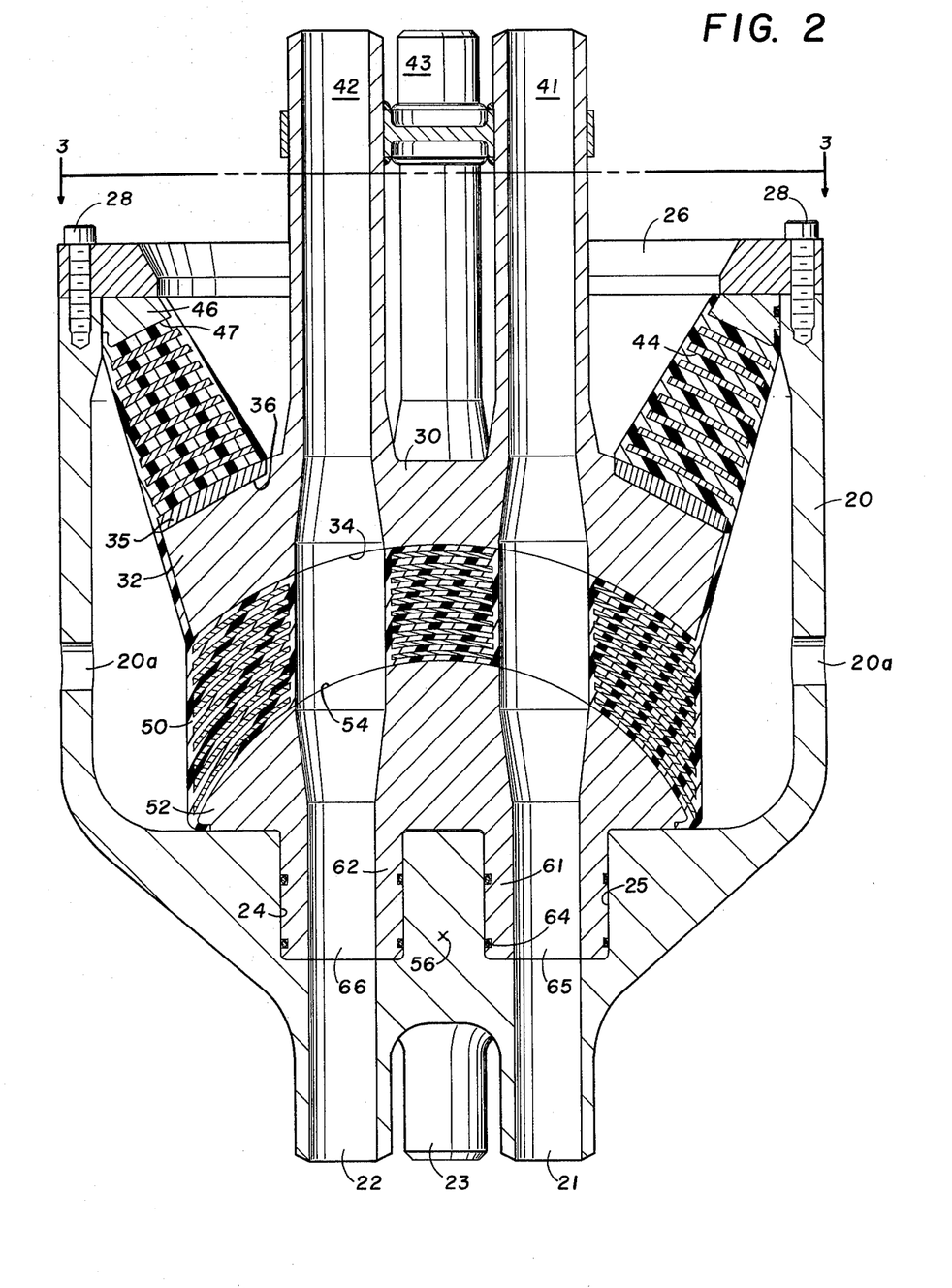
FIG. 2 is a sectional view of a flexible connector of FIG. 1.
Figure 3:
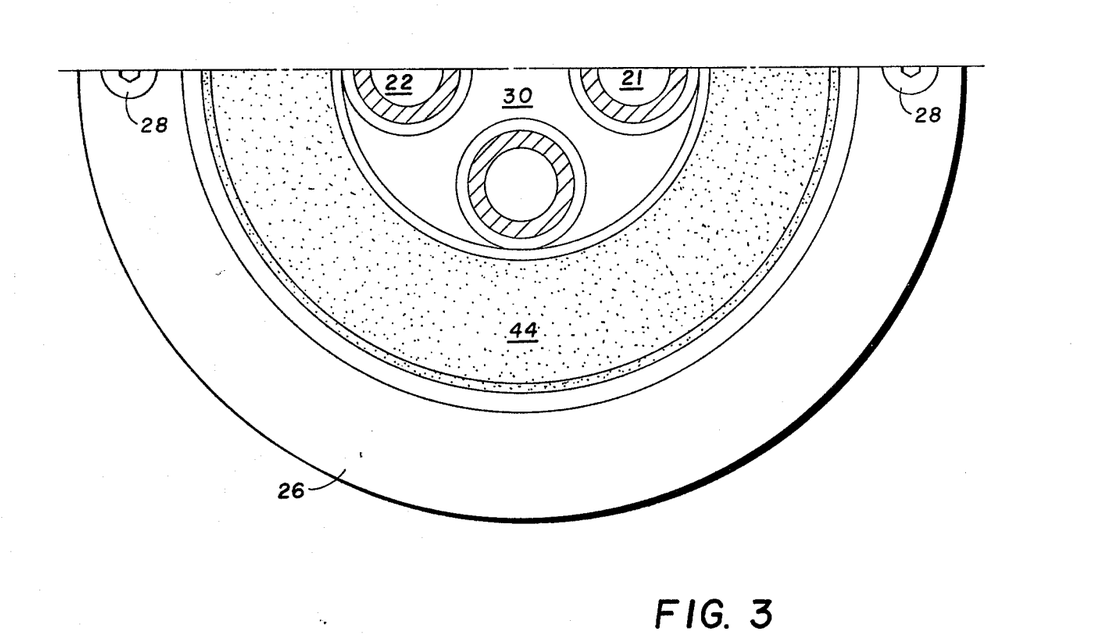
FIG. 3 is a sectional view taken along lines 3—3 of FIG. 2.

FIGS. 2 and 3

Figures 4, 5:
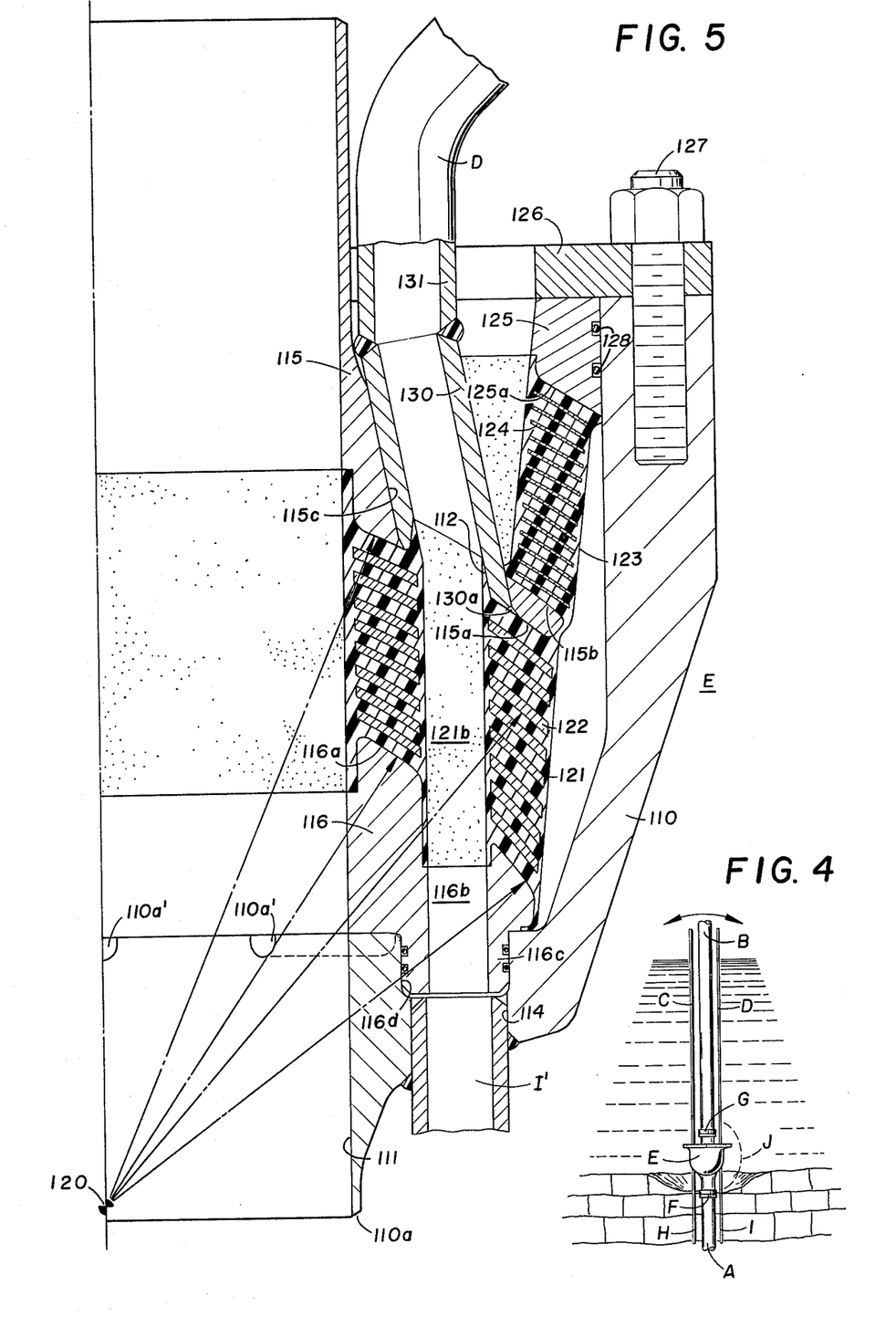
FIG. 4 depicts an ocean floor installation of a connector embodying the present invention.
FIG. 5 is an elevational view partially in section of a preferred embodiment of the present invention.

An embodiment of such a flexible connector is illustrated in FIGS. 2 and 3. While the connectors 16 and 17 of FIG. 1 are illustrated as accommodating two passages, the unit of FIGS. 3 and 4 is symmetrical to a center axis and accommodates four passages.

Referring to FIG. 2, a hollow cup-shaped housing 20 is symmetrical to a central axis and has four ports extending through the bottom thereof, three of which are shown in FIG. 2. A first port 21 is positioned to the right of the center axis. A second port 22 is positioned on the left side. A port 23 is positioned 90° from the axes of ports 21 and 22. A fourth port (not shown) would be positioned 90° from ports 21 and 22 and diametrically opposite port 23. The ports 21–23 are formed as reentrant openings in the bottom of the housing 20. More particularly, the passage forming port 21 extends from the bottom of a relatively short well 25 which is cylindrical and axially aligned with port 21. Similarly, a well 24 is axially aligned with port 22. Such wells are also provided in axial alignment with the port 23 and the fourth port (not shown).

The lip of the housing 20 is connected as by a ring of bolts to a capture ring 26. Only two bolts, the bolts 28, are shown in FIG. 2 but is is understood that a circular array of such bolts adequate to maintain the capture ring 26 in position would be employed.

A nipple 30 having a flared end 32 is positioned in the housing 20 and is characterized by a downfacing spherically concave surface 34 and an upfacing conical surface 36. The nipple has four flow ports therethrough, namely the ports 41, 42 and 43 and a fourth port (not shown). Port 41 is illustrated in axial alignment with port 21, port 42 with port 22, and port 43 with port 23.

An outer elastomeric bearing seal 44 is bonded to the outer surface of a ring 35 which has an inner conical surface which is seated on an outer conical surface 36 of nipple 30. Bearing seal 44 is also bonded to a downfacing spherical surface of a seal ring 46.

An inner seal 50 is bonded to the concave surface 34 of nipple 30 and is also bonded to the upper surface 54 of a spherically convex seat 52. The inner seal 50 and the seat 52 have passages therethrough which interconnect ports 21, 22 and 23 with ports 41, 42 and 43, respectively.

The upper spherical surface 54 of seat 52 has a center 56 which is the common center for all of the bearing surfaces associated with the inner seal 50 and the outer seal 44.

The elastomeric seals 44 and 50 are comprised of pads of rubber adhered to the inner and outer surfaces of structural rings all of which are spherical relative to the center point 56. The rings may be metal or other suitable material employed in elastomeric bearings. Similarly, the surfaces 34 and 36 have point 56 as their center of curvature as does the surface 47 of the ring 46.

The seat 52 is characterized not only by the upper spherical surface 54 but also by the fact that it has a plurality of bottom cylindrical extensions or pistons. A first piston 61 extends into well 25 and has a bore therein axially aligned with the port 21. A second piston 62 is seated in well 24 and has a passage therethrough continuing the port 22. Similar pistons are provided for the port 23 and the fourth conduit (not shown).

The pistons include O-rings in surface grooves such as groove 64 so that a fluid tight seal is maintained between the pistons 61 and 62 and the wells 25 and 24, respectively. By this means, the elastomeric seal members 44 and 50 are maintained in compression while permitting the axis of the nipple 30 to be tilted relative to the axis of the housing 20.

High static pressures outside the structure are effective on the upper surface of the outer seal 44 as well as on the outer surface by reason of ports 20a in the wall of housing 20. Such pressures are effective to compress the inner seal 50.

Similarly, the internal pressures in ports 21–23 are effective to force the seat 52 upwards. More particularly, the fluid pressures are effective on the lower ends of the pistons 61 and 62 at the boundaries 65 and 66 thereof.

With the structure shown in FIG. 2, input conduits such as pipes 13 and 14 of FIG. 1 may be connected to the bottom of the housing 20 as by welding. Output pipes, such as pipes 18 and 19 of FIG. 1, may be connected as by welding to the ports 41 and 42 of nipple 30. The connector of FIG. 2 then permits the relative motion inherent in the installation of FIG. 1 without unduly stressing the input and output pipes.

FIG. 3 is a top one-half view of the connector of FIG. 2 as taken along the sectional lines 3—3 of FIG. 2. The ports 21, 22 and the port opposite port 23, are shown.

In FIG. 2 it will be recognized that the elastomeric bearing 44 is constructed as an entity separate from the rest of the system and is dimensioned to be seated on outer conical surface 36 of nipple 30. In this arrangement the bearing 44 is captured by ring 26 to resist upward movement of the nipple 30 relative to the housing 20. By this construction, the bearing 44 may be independently fabricated and then inserted during assembly. It will be recognized, however, that the upper surface of the flared end 32 of nipple 30 may be spherically shaped and that the bearing 44 may be bonded directly to the upper surface of the nipple itself. For the multi-channel connector shown in FIG. 2, the housing 20 has ports 20a so that external pressure is effective on both sides of bearing 44. In such case the bearing 44 may be a separate element and the construction of FIG. 2 is preferred because of the simplification permitted in the manufacturing process.

FIG. 4

Referring now to FIG. 4, a connector couples an oil well pipe A to a riser pipe B while accommodating auxiliary flow pipes C and D. Such connectors are usefully located at the ocean floor as illustrated and at the top of riser pipe B (not shown) where connections are to be made to a surface vessel or platform. Multi-passage flexible connector E is secured to the well pipe A by flange connection F and to the riser B by a flange connection G. Connections between the auxiliary pipes C and D and the downhole pipes H and I are provided in the flexible connector E as to permit the control pipes CH and DI, respectively, to be rigidly connected and to be of high integrity. The multi-passage flexible connector E eliminates the necessity of the use of flexible hoses of the type heretofore used which hoses would pass around the flexible connector E such as along the path J shown dotted.

The auxiliary pipes C and D extend from surface control structure and may be used for any downhole control function. It is conventional to provide controls which will selectively kill or choke the well. That is, one of the lines may be employed hydraulically to actuate a downhole control to stop flow from the well or to kill the well. Another control line may be used to adjust the size of the choke in the flow channel through which production passes to regulate the daily flow to a desired rate below a potential rate or to correspond with production rates authorized by regulatory commissions as the case may be.

FIG. 5

Referring now to FIG. 5, a preferred embodiment of the invention has been shown in section, one-half of the connector being shown in a longitudinal section from the center line to the outer periphery. The flanges F and G of FIG. 4 have not been shown but normally would be welded to the lower and to the upper extremities, respectively, of the structure shown in FIG. 5.

The multi-channel marine riser has integral auxiliary flow passages only one of which, the passage formed by pipes D and I of FIG. 4, is shown. A plurality of such passages may be provided to accommodate different producing operations as may be necessary.

An annular cup-shaped housing 110 has a central bottom port 111 and one or more auxiliary ports, such as the port 112. Port 111 is formed centrally in the bottom 110a of the housing 110. Auxiliary pipe I is welded into an orifice 114 in the bell portion of housing 110.

A hollow flanged nipple 115 extends with the flanged end 115a thereof positioned inside housing 110. A support ring 116 is provided with a central bore corresponding with the port 111. Outer surface 116a of ring 116 is spherical in configuration with the center of curvature at point 120. A first elastomeric bearing member 121 is bonded to the outer surface 116a and comprises a series of concentric spherical rings 122 embedded in a rubber cylinder. The rubber is also bonded to the inner surface of flanged end 115a of the nipple 115. Ring 116 has two downwardly extending pistons, one of which, the piston 116c, is shown. Piston 116c carries O-rings to seal in well 116d and to permit upward movement in response to pressure in channel 116b to compress elastomeric bearing member seal 121.

A second elastomeric bearing member 123 is bonded to the outer surface 115b of the flanged nipple 115. It comprises a plurality of spherically shaped rings 124 whose centers are at point 120. The outer end of the bearing member 123 is bonded to the inner surface 125a of slide ring 125. Ring 125 carries O-rings to seal against the inside of housing 110. A capture ring 126 is secured to the mouth of housing 110 by a ring of studs, such as the stud 127.

The bearing member 121 and bearing member 123 may be formed integrally or may be formed separately.

In accordance with the present invention, the channel I is continued through connector E as to include an auxiliary port through the flanged nipple 115. More particularly, a channel 116b extends through the ring 116 and is in registration with a passage 121b through the bearing member 121. A port 115c is provided in the flanged portion of nipple 115 and receives a pipe 130 therein which is welded to pipe D. Pipe 130 is welded in port 115c. The axis of the pipe 130 deviates slightly from the axis of pipe D as to extend inwardly towards the wall of the flanged nipple 115.

With the foregoing structure, it will be seen that the main port 111 is provided in the connector to permit the riser B, FIG. 4, to tilt relative to well pipe A. At the same time, the pipe I is coupled through the unit independent of port 111. By reason of the bearing members 121 and 123 and the provision of the port 115c in the nipple 115, the auxiliary passage through pipes D-I extends through the connector E without imparing or inhibiting the flexibility of the system.

While only one port 112 has been shown in FIG. 5, it will be understood that more than one may be provided. For example, four, six, eight or 10 such passages may be provided at circumferentially spaced locations depending upon the requirements to be satisfied.

In FIG. 5 the bearing member 121 has been illustrated and represented to be a continuous bearing, continuous in revolution relative to the axis of connector E. It will be understood that the rubber portions of bearing member 121 may be provided as to be only concentric to the axis of the port 112 and may be eliminated in zones between adjacent passages where more than one passage is provided. If only one auxiliary passage is provided, the rubber between rings 122 would be provided at locations symmetrical to the axis of connector E to provide stability. However, where the bearing member 121 is continuous, the bottom of housing 110 will preferably be grooved radially at locations between pistons such as piston 116c for equalization of pressure inside and outside bearing member 121 and to pressurize outer seal 123. Grooves 110a are shown in FIG. 5. Seal ring 125 carries O-rings in annular grooves 128 to maintain a seal with the inner wall of the housing 110 near the lip thereof.

Hydraulic lines to actuate downhole controls may thus be rigidly piped from connector to connector advantageously to eliminate the costly and unreliable high pressure flex hoses used in prior systems.

Figure 6:
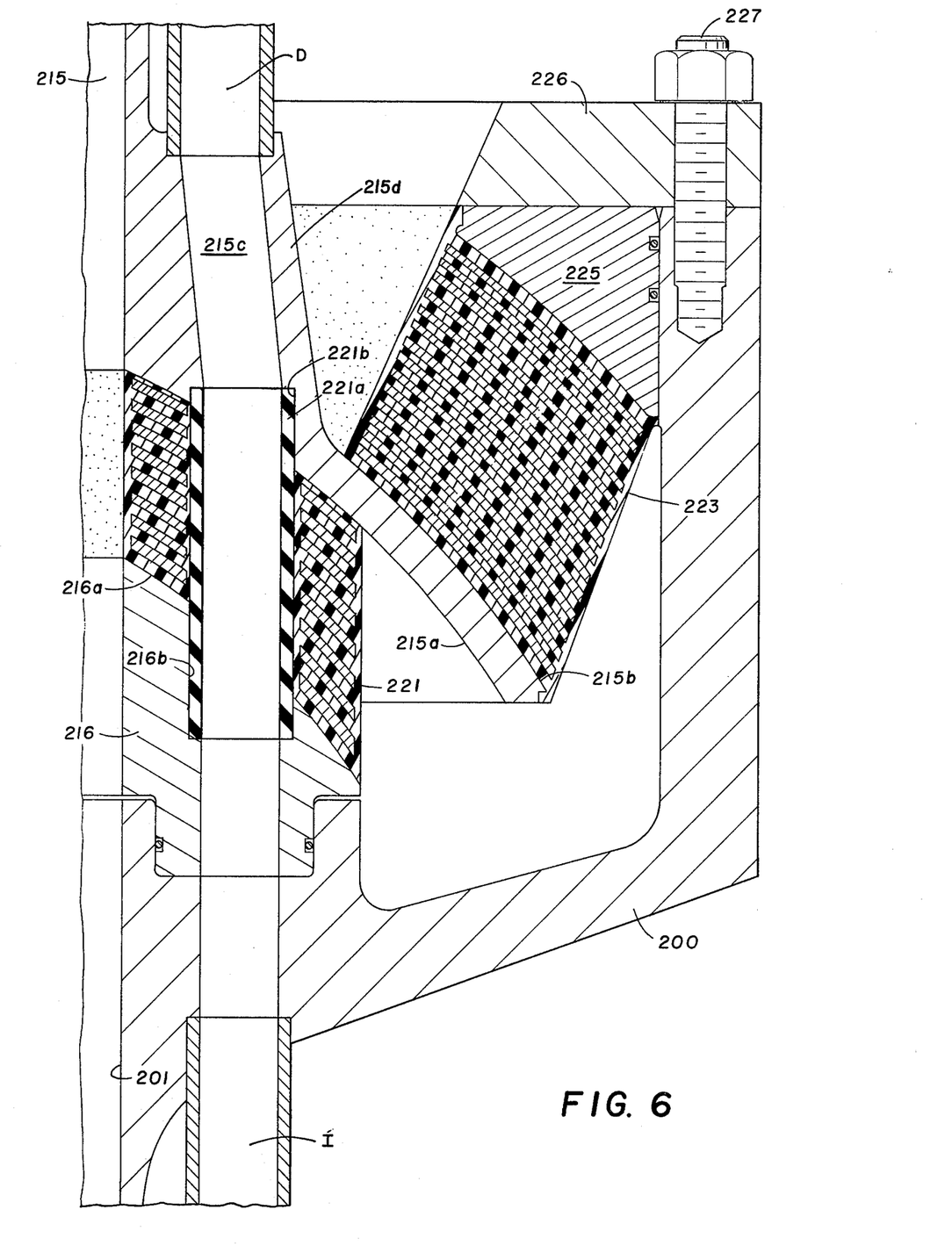
FIG. 6 illustrates a modified form of the connector of FIG. 1.

FIG. 6

In FIG. 6, a wall section of a modified form of the invention has been illustrated. Housing or cup 200 is provided with a main central port 201 and with upper and lower auxiliary pipes D and I. In this embodiment, the inner elastomeric seal 221 is cylindrical in form and is bonded to the upper surface 216a of a piston bearing ring 216. The upper end of the inner seal 221 is bonded to a portion of the inner surface 215a of the flanged nipple 215. Pipe D is secured in a socket at the upper end of a bore 215c which extends through a thickened wall section 215d of nipple 215. The axis of the bore 215c is slanted downwardly and outwardly and is in registration with the upper end of a reinforced rubber tube 221a. Tube 221a extends through the inner seal 221 and is bonded into a downfacing well 221b at the lower end of the bore 215e. The lower end of the reinforced rubber tube 221a is bonded into an upfacing well 216b in the upper surface of the ring 216.

The outer seal 223 is bonded to the outer surface 215b of the flared end of nipple 215. The upper end of the outer seal 223 is bonded to the lower surface of a sealing ring 225 which is captured by flange 226. Flange 226 is secured to the mouth of the housing 200 as by studs 227.

Thus, the embodiment illustrated in FIG. 6 involves a flared nipple having the thickened section 215d and the use of a rubber reinforced tube 221a to extend through the inner seal 221. In other respects, connectors made in accordance with FIG. 6 operate as the connectors of FIG. 5. The upper surface of ring 216, the surfaces 215a and 215b of the flared end of the nipple 215, the lower surface of the ring 225 and the reinforcing rings in the inner seal 221 and the outer seal 223 are spherical in shape with respect to a common center point permitting deflection of the nipple 215 relative to housing 200 while maintaining a seal relationship. As in FIG. 5, the ring 216 is pierced so that pressure inside the port 201 will be effective on the inner surface of the outer seal 223 to compress the same when pressure inside port 201 is greater than the pressure outside. On the other hand, when the external hydrostatic pressure on the outer surface of the outer seal 223 exceeds the pressure inside, then the seal ring 225 will move downward as the outer seal 223 is placed in compression.

It will be appreciated that the foregoing description of the drawings is in terms dictated by the orientation of the drawings. Reference has been made to upper surfaces and lower surfaces. In FIGS. 2, 4, 5 and 6, the housing 20, 110 and 200, respectively, are shown with the mouth of the cup upfacing. In each case the nipple is inserted downwardly into the cup. It is to be understood that in operation the coupling can assume any orientation desired. For example, the housing 20, FIG. 2, may be installed in a downfacing position with the nipple extending upwardly. In instances where a flexible coupling is desired for passage of flow channels through a vertical bulkhead, the axis of the coupling would be horizontal with the bulkhead in a plane parallel to the plane of the capture ring 26, FIG. 2. Thus, such terminology as has been employed is not necessarily limiting as to orientation of the unit.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a flexible connector for interconnecting a plurality of input and output conduit pairs for relative angular deflection between mating input and output conduits wherein a ported cup receives a nipple having an outwardly flared wall structure, the combination comprising:
   (a) an outer reinforced elastomeric annular support between and in contact with the outer surface of said wall structure and the wall of said cup,
   (b) an inner reinforced elastomeric seal between and in contact with the inner surface of said wall structure and structure within said cup, and
   (c) structure forming a plurality of laterally offset and spaced apart flow channels individually interconnecting said input and output conduits and extending through said nipple including flow ports through said wall structure and through the body of said inner elastomeric seal with the axis of each being laterally offset from the axis of said cup.
   (d) and means for retaining said combination is assembled relationship.

2. The combination of claim 1 in which said cup, nipple, and seal have a plurality of parts forming additional conduits spaced laterally from the axis of said cup.

3. The combination set forth in claim 1 in which the side wall of said cup is perforated and in which said outer annulus support is captured between the lip of said cup and the outer surface of said nipple and includes an inner ring having an inner conical surface engaging said nipple and an outer spherical surface to which elastomeric elements are bonded.

4. The combination set forth in claim 1 in which the side walls of said cup are imperforate and in which said outer elastomeric annual support is bonded to the outer surface of said nipple and is sealed in sliding relation to the inner wall of said cup at a zone near the lip of said cup.

5. The combination set forth in claim 1 in which reinforced resilient tubing extends through at least one of said flow channels that extends through said inner reinforced elastomeric seal and is seated at opposite ends thereof in said nipple and in structure in said cup for resisting corrosive mediums while permitting deflection between said cup and said nipple.

6. In a flexible connector for interconnecting a plurality of input and output conduit pairs for relative angular deflection between mating input and output conduits wherein a ported cup receives a nipple having an outwardly flared wall structure, the combination comprising:
   (a) an outer reinforced elastomeric annular support between and in contact with the outer surface of said wall structure and the wall of said cup,
   (b) an inner reinforced elastomeric seal between and in contact with the inner surface of said wall structure and structure within said cup, and
   (c) structure forming a plurality of laterally offset and spaced apart flow channels individually interconnecting said input and output conduits and extending through said nipple including flow ports through said wall structure and through the body of said inner elastomeric seal with the axis of each being laterally offset from the axis of said cup; said cup, nipple and seal having aligned axially located ports for forming an additional conduit spaced laterally from the axis of said cup, with structure for directing flow from at least one of said axially located ports to the zone in said cup outside said inner reinforced elastomeric seal
   (d) and means for retaining said combination in assembled relationship.

7. The combination set forth in claim 6 in which said lateral structure comprises grooves in the bottom of said cup extending the thickness of said inner elastomeric annular seal at locations spaced from said flow channel.

8. In a riser connector for interconnecting a plurality of input and output conduit pairs for relative angular deflection between mating input and output conduits wherein a ported cup receives a hollow nipple having a flared end, the combination comprising:
   (a) an outer reinforced elastomeric seal between and in contact with the outer surface of said flared end and the wall of said cup,
   (b) an inner reinforced elastomeric seal bonded to the inner surface of said flared end,
   (c) a support ring supported by said cup and bonded to the lower end of said inner seal and having at least one piston extending therefrom downward in sealed working relation in a port in the bottom of said cup, and
   (d) structure forming a plurality of laterally offset and spaced apart flow channels individually interconnecting said input and output conduits and extending through said nipple including ports through the wall structure of said flared end and ports through said piston interconnected by ports through said inner seal
   (e) and means for retaining said combination in assembled relationship.

9. The combination set forth in claim 8 in which structure is provided for directing flow to the zone inside said cup outside of said inner reinforced elastomeric seal.

10. The combination set forth in claim 8 in which said cup has a central channel at the axis thereof and an array of ports radially spaced from said center channel and from each other and in which said support ring has a channel aligned with said central channel in said cup and further has a plurality of pistons, one working in each of said ports in sealing relation to prevent mixing of fluids in said central channel and in said auxiliary ports.

11. A multi channel flexible connector which comprises:
   (a) an open cup having a bottom with an axial central port and a plurality of spaced apart ports laterally offset from said central port, (b) a hollow nipple having a flared end extending into said cup from the mouth thereof and having an axial port and a plurality of laterally offset ports passing through said flared end of said nipple and aligned with said laterally offset ports in the bottom of said cup, (c) an outer reinforced elastomeric seal between and in contact with the outer surface of said flared end and the wall of said cup, (d) an inner reinforced elastomeric seal bonded to the inner surface of said flared end and having passages in alignment with said laterally offset and spaced apart ports extending through said flared end, (e) a support ring supported by the bottom of said cup and bonded to the lower end of said inner seal and having pistons formed on the surface thereof opposite said inner seal and extending into said ports in the bottom of said cup with passages through each of said pistons for flow communication to said passages in said inner elastomeric seal, and (f) structure adapted for connection of exterior flow channels to said central ports in said cup and nipple and to each of said laterally offset ports in said cup and in said nipple (g) and means for retaining said combination in assembled relationship.

* * * * *

UNITED STATES PATENT AND TRADEMARK OFFICE
CERTIFICATE OF CORRECTION

PATENT NO. : 4,103,939

DATED : August 1, 1978

INVENTOR(S) : John T. Herbert; Frank J. Kovitch; Paul E. Sullivan

It is certified that error appears in the above-identified patent and that said Letters Patent are hereby corrected as shown below:

Col. 3, line 9, change "is is" to -- it is --.
Col. 5, line 38, change "I" to -- I' --.
Col. 6, line 9, change "Grooves 110a" to -- Grooves 110a' --.
Col. 6, line 34, change "215e" to -- 215c --.

Signed and Sealed this

Twelfth Day of June 1979

[SEAL]

Attest:

RUTH C. MASON
Attesting Officer

DONALD W. BANNER
Commissioner of Patents and Trademarks